(12) United States Patent
Buelna

(10) Patent No.: US 8,231,503 B2
(45) Date of Patent: Jul. 31, 2012

(54) TORQUE BALANCING GEARBOX

(75) Inventor: Terry Buelna, Lake Forest, CA (US)

(73) Assignee: Karem Aircraft, Lake Forest, CA (US)

( * ) Notice: Subject to any disclaimer, the term of this patent is extended or adjusted under 35 U.S.C. 154(b) by 764 days.

(21) Appl. No.: 12/399,594

(22) Filed: Mar. 6, 2009

(65) Prior Publication Data

US 2009/0227415 A1     Sep. 10, 2009

Related U.S. Application Data

(60) Provisional application No. 61/034,462, filed on Mar. 6, 2008.

(51) Int. Cl.
    *F16H 57/08*     (2006.01)
(52) U.S. Cl. ........................................................ 475/344
(58) Field of Classification Search ................... 475/344
See application file for complete search history.

(56) References Cited

U.S. PATENT DOCUMENTS

| | | | |
|---|---|---|---|
| 2,467,226 A | 4/1949 | Place | |
| 2,909,944 A | 10/1959 | Bouvier | |
| 3,430,522 A | 3/1969 | Hawkins et al. | |
| 4,321,842 A | 3/1982 | Stromotich | |
| 4,512,213 A | 4/1985 | Newton | |
| 6,024,549 A | 2/2000 | Lee | |
| 6,615,683 B1 | 9/2003 | Voigt | |
| 2005/0043136 A1* | 2/2005 | Colter et al. | 475/344 |
| 2006/0000300 A1 | 1/2006 | Vialle | |
| 2006/0205557 A1* | 9/2006 | Arndt et al. | 475/331 |

FOREIGN PATENT DOCUMENTS

JP     07105640     4/1995

OTHER PUBLICATIONS

Coy, et al.; "Helicopter Transmission Research at NASA Lewis Research Center", NASA Technical Memorandum 100962 [online], Nov. 1988 [retrieved on Jun. 8, 2009]; retrieved from the internet <url:http//www.dtic.mil/cgibin/GetTRDoc?ASD=ADA242220 &Location=U2&doc=GetTRDoc.pdf>.

* cited by examiner

*Primary Examiner* — Edwin A Young
(74) *Attorney, Agent, or Firm* — Fish & Associates, PC

(57) ABSTRACT

A gearbox comprising a gearset is able to transmit high output torques at high numerical reduction ratios at a power-to-weight ratio higher than previously attainable with existing designs. A distributor gear is disposed relative to a spur gear in order to produce automatic torque balancing. The distributor gear can be advantageously configured as an input floatring gear, for which support in all directions is provided by gear tooth mesh forces rather than bearings. Automatic torque balancing is achieved by configuring the distributor gear with first and second rows of helical teeth on the external circumference, and with a set of double helical teeth disposed on the internal circumference of the distributor gear. This allows for the placement of up to 50 or more planet gears in a countershaft arrangement with one end having helical teeth and the other end having spur teeth.

14 Claims, 8 Drawing Sheets

TORQUE BALANCING GEARBOX

This application claims priority to U.S. provisional application Ser. No. 61/034,462, filed Mar. 6, 2008, the disclosure of which is incorporated herein by reference in its entirety.

FIELD OF THE INVENTION

The field of the invention relates to the transmission of power by gears.

BACKGROUND

When gas turbine or turboshaft engines are employed to drive a plant, machinery, or a vehicle, a high numerical reduction ratio is frequently required because of the high output speed (often measured in rotations per minute or rpm) of the turbine. Power transmission of several thousands of horsepower is encountered in many applications. In the case of a stationary plant, or in marine applications, mechanical reliability can be readily achieved if the weight of the gearbox is not critically important. However, with propeller drives for aircraft or rotor drives for helicopters, weight and efficiency of the gearbox are critically important. This requirement led to the widespread adoption of planetary or epicyclic gearboxes in flight applications. Planetary gearboxes achieve their weight advantage over simple gear trains of the same ratio by virtue of increasing the number of mesh points, and hence load-carrying gear engagements, in a given circumferential length of gearing.

With increasing scale and power transmission capacity, the weight of a gearbox increases approximately as a cube function of linear size because the steel elements of the gears span the entire radial distance from the center of rotation to the periphery of the largest gear, usually a ring gear. The tangential force resisting a torque is inversely proportional to the distance from the center of rotation, thus it is clear that while gear tooth loading from tangential force decreases with radius, weight increases disproportionately.

A conventional prior art planetary gear assembly 100 is shown in FIG. 1. Four planet gears 120, 122, 124, 126 orbit and mesh with a central sun gear 130. The planet gears 120, 122, 124, 126 are constrained within and mesh with a ring gear 110.

A prior art planetary reduction gearbox system 200 is shown in FIG. 2, adapted from Dudley's Gear Handbook, McGraw-Hill, 1991. FIG. 2 shows a rotating planetary carrier 254 and a fixed annulus, ring gear 240 having teeth 242. An input shaft 210 rotates as shown by arrow 212 and is connected to a sun gear 214. The sun gear meshes with a plurality of planet gears 220, 230 having teeth 222. The planet gears 220, 230 are on shafts 224, 234 fixed to a planet carrier 250. The planet carrier rotates as shown by arrow 254 and is fixed to an output shaft 252. A double planetary system (not shown) could be formed by combining the gearsets of FIGS. 1 and 2, where the first stage planetary is as gearset 200, but the rotating planet carrier 250 is attached to a sun gear 130 of the second planetary assembly 100. The second planetary assembly 100 usually has a rotating carrier attached to a final output shaft which could be a rotor shaft in a typical helicopter transmission. In the case of a helicopter planetary, the reduction ratio of each planetary reduction is usually limited to 3.875 because that is all that can be achieved with a maximum of six planets revolving around the sun gear.

Such prior art planetary gearbox systems tend to become extremely heavy and thus impractical for aircraft applications when scaled to sizes commensurate with large transport aircraft. Thus, a need remains for a highly efficient, light weight gearbox system for aircraft applications.

SUMMARY OF THE INVENTION

The present inventive material provides systems, methods, and apparatus in which a gearbox comprising a gearset is able to transmit high output torques at high numerical reduction ratios at a power-to-weight ratio higher than previously attainable with existing designs. These high power-to-weight ratios are achieved through the use of a large array of load sharing gears.

In preferred embodiments, a distributor gear is disposed relative to a spur gear in order to produce automatic torque balancing. The distributor gear can be advantageously configured as an input floatring gear, for which support in all directions is provided by gear tooth mesh forces rather than bearings. It is further contemplated that the distributor gear could be configured with first and second rows of helical teeth oriented to opposite sides of the gear and disposed on the external circumference of said gear, with a set of double helical teeth disposed on the internal circumference of the distributor gear.

Such a preferred configuration could advantageously allow for the placement of at least 6, 10, 20, 30 or 50 planet gears that mate with the first row of helical teeth as well as at least 6, 10, 20, 30 or 50 planet gears that mate with the second row of helical teeth. It is contemplated that these planet gears could further be placed in a countershaft arrangement whereby some face forward and some face aft, thereby distributing load more evenly and allowing for the geometric fit of more planet gears.

It is further contemplated that each planet gear could be configured with one end having helical teeth and the other end having spur teeth. In preferred embodiments, the end with helical teeth would mate with the distributor gear, while the end with spur teeth would mate with a spur gear that is also an output internal ring gear. Further, the helical and spur gears could be advantageously sized and dimensioned to produce a reduction of at least 4:1, 10:1, 20:1, 50:1, or even 80:1. In especially preferred embodiments, a rotorcraft is equipped with the gearset as described above.

Viewed from another aspect, the present inventive subject matter allows for a gearbox to yield a power-to-weight ratio of at least twice that of a corresponding prior art double planetary reduction system. This reduction in power-to-weight ratio is achieved by having a number of planet gears disposed about a distributor gear, where the number of planet gears is at least 12, 20, 40, or even 60. It is contemplated that the planet gears could be sized to collectively transfer at least 5000, 20,000, or even 50,000 horsepower.

The planet gears can advantageously be manufactured with a helical tooth pattern, and could be disposed on opposite sides of the ring gear in a countershaft arrangement. In more preferred embodiments, the planet gears are disposed to transmit power to an output ring gear having internal spur teeth. Further, in especially preferred embodiments, the planet gears, distributor gear, and output ring gear are sized and dimensioned to yield a power-to-weight ratio of at least three times that of the corresponding double planetary reduction system.

Various objects, features, aspects and advantages of the inventive subject matter will become more apparent from the following detailed description of preferred embodiments, along with the accompanying drawing figures in which like numerals represent like components.

DETAILED DESCRIPTION OF THE INVENTION

Figure 1:
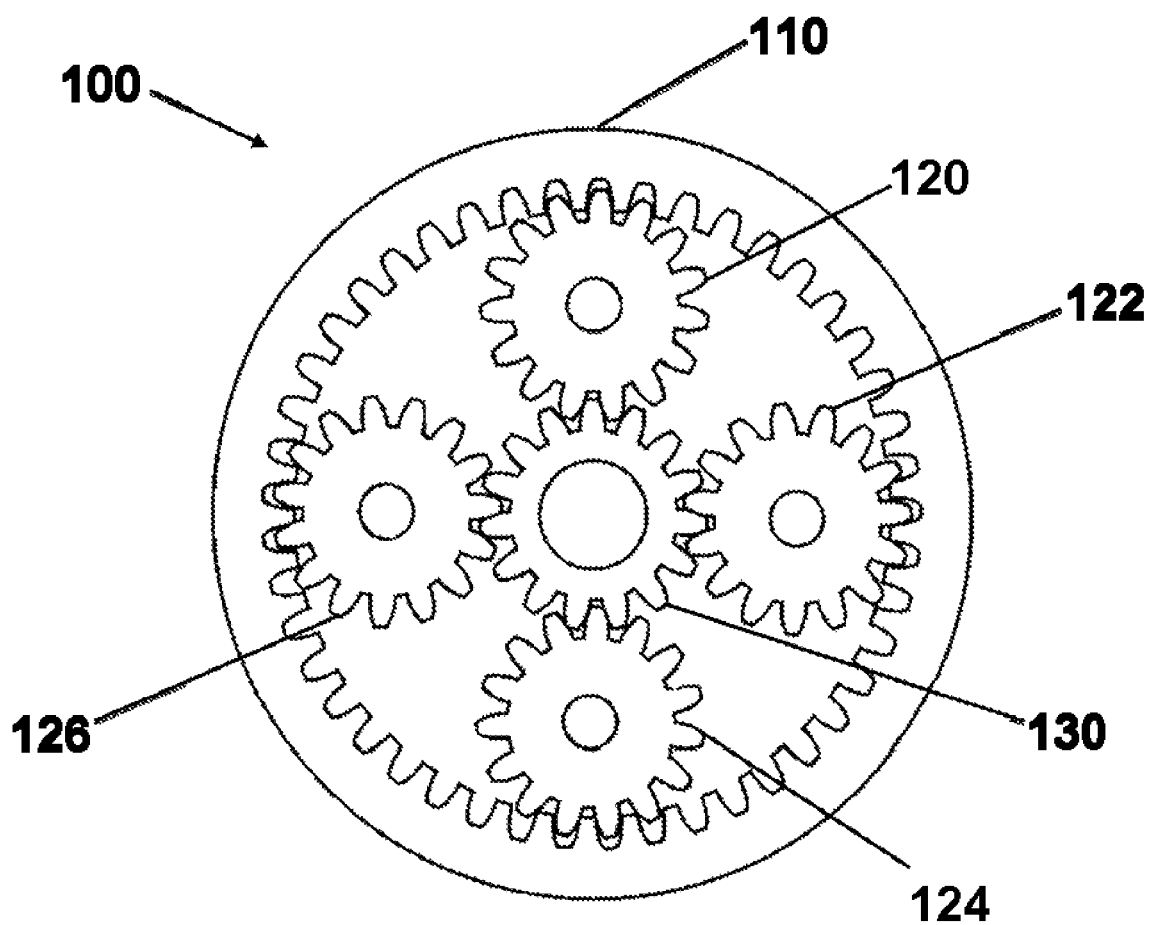
FIG. 1 is a schematic of a prior art planetary gearset.
Figure 2:
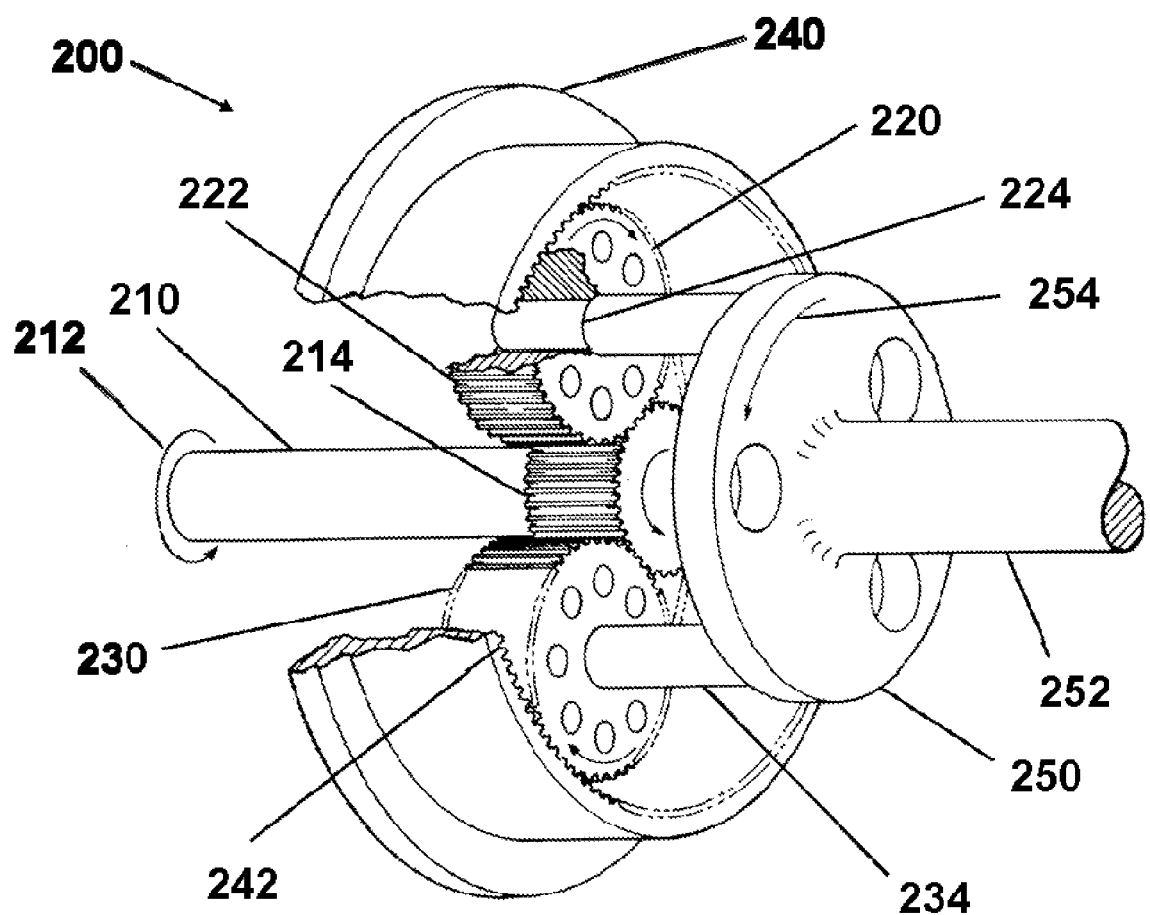
FIG. 2 is a perspective illustration of a prior art planetary gearset with a rotating planet carrier.
Figure 3:
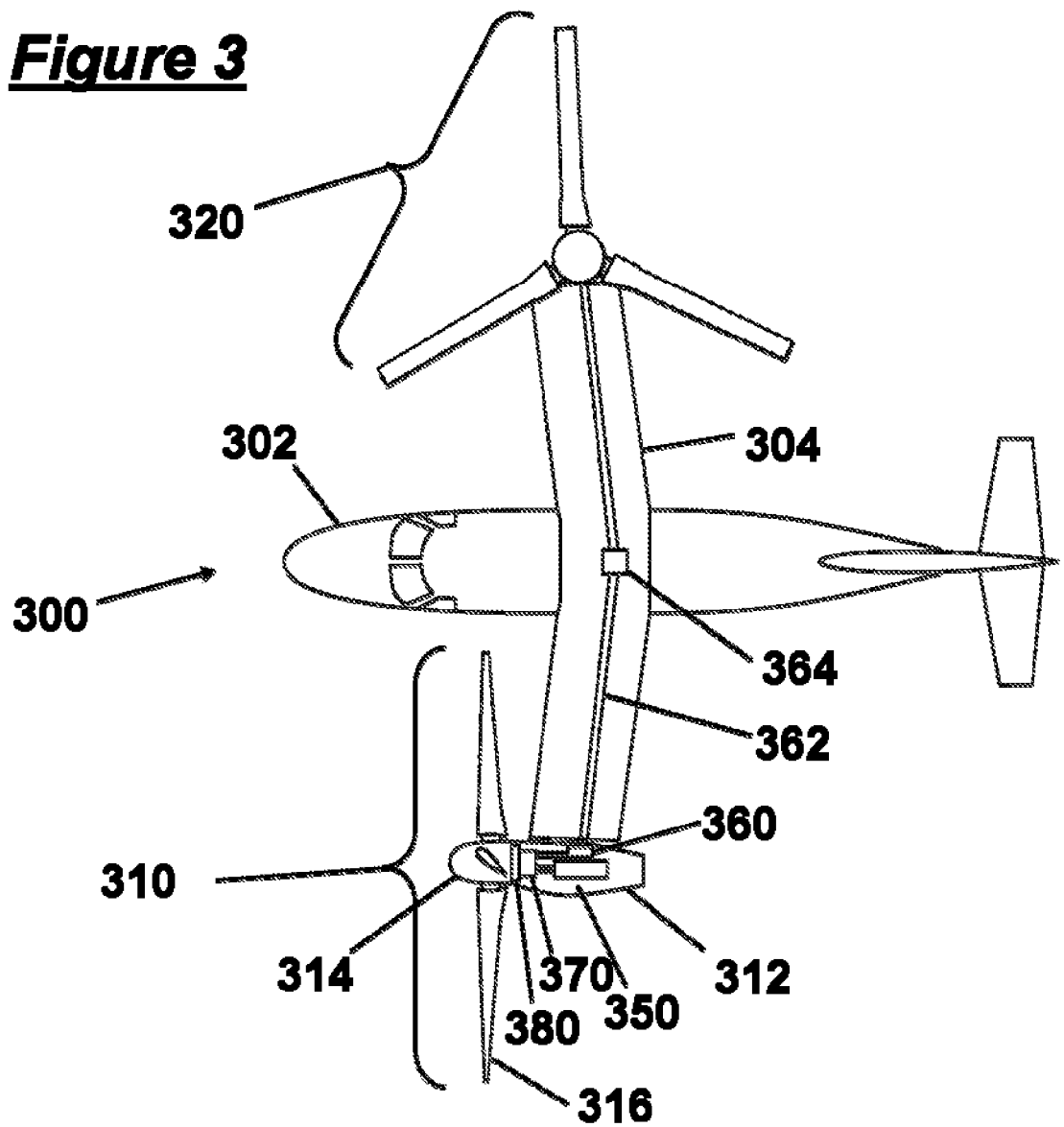
FIG. 3 a schematic of a preferred tiltrotor aircraft having a gearbox and rotor.

FIG. 3 is a schematic top view illustration of a preferred tiltrotor aircraft 300. The aircraft comprises a fuselage 302, wing 304, first rotor system 310, and second rotor system 320. The second rotor system 320 is shown in a vertical orientation, consistent with helicopter-mode flight. The first rotor system 310 is shown in a horizontal orientation, consistent with airplane-mode cruise flight. In practice, the first rotor system 310 and second rotor system 320 are likely to have a substantially similar orientation at any given time in flight.

A rotor system 310 comprises a hub 314 coupled to a tilting nacelle 312, which tilts with respect to the wing 304. A rotor blade 316 is coupled to the rotor hub 314. An engine 350 is preferably disposed within the tilting nacelle 312 and is coupled to a shifting gearbox 370. The shifting gearbox is coupled to a numerical reduction ratio reduction gearbox 180. The reduction gearbox 380 is coupled to and drives the rotor hub 314. A miter gearbox 360 is also coupled to the shifting gearbox 370 as well as a cross-wing driveshaft 362. The cross-wing driveshaft 362 is preferably disposed within the wing 304 and distal ends of the cross-wing driveshaft 362 are preferably coupled by a mid-wing gearbox 364. The cross-wing driveshaft 362 serves to transmit power from an engine 350 in a first tilting nacelle 312 to a rotor system 320 on the opposite side of the aircraft 300.

An especially preferred shifting gearbox 370 is described in U.S. provisional patent application ser. No. 61/034,457, "Rotorcraft Engine and Rotor Speed Synchronization", filed Mar. 6, 2008. An especially preferred tiltrotor rotor system 310 is described in U.S. Pat. No. 6,641,365 to Karem. This and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

Figure 4:
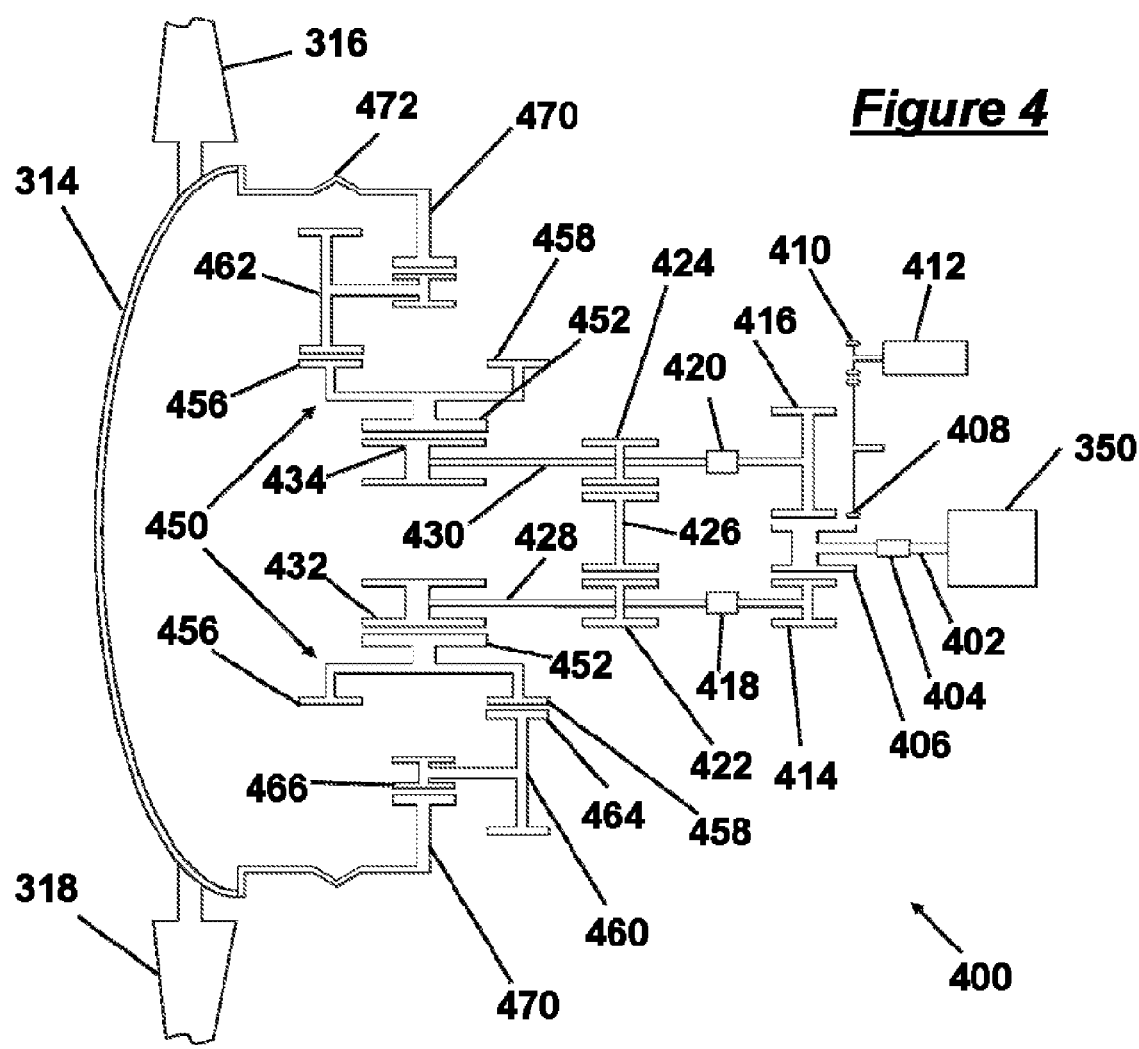
FIG. 4 is a schematic of a preferred reduction gearset layout.

FIG. 4 is a schematic depiction of a preferred tiltrotor drivetrain 400. An engine 350 is coupled to an engine input shaft 402. A sprag clutch 404 is torsionally coupled between the engine input shaft 402 and an engine pinion gear 406. The engine pinion gear 406 meshes with both a high output speed shift gear 414 and low output speed shift gear 416. Through the use of a first dog clutch 418 and second dog clutch 420, only one of the high output speed shift gear 414 and low output speed shift gear 416 transmit power to the first torque split gear 422 or second torque split gear 424. The two torque split gears 422, 424 are connected through a torque split idler gear 426, which assists in sharing input torque.

An accessory gear 408 meshes with the input selection gear 406 and powers accessories such as an oil pump or generator 412 through a generator gear 410. Thus, a generator 412 is torsionally coupled in the drivetrain 400, and is preferably sized to produce at least 10, 50, 100, 250, or even 500 kilowatts of electrical power.

Power is shared between and transmitted by first and second torque split gears 422, 424 to first and second distributor gear pinions 432, 434 by means of first and second quill shafts 428, 430. A quill shaft 428 is a torsionally compliant member coupled between a torque split gear 422 and a distributor gear pinion 432. The opposite ends of the quill shaft 428 are advantageously splined for connection with a gear with a different number of spline teeth on either end of the quill shaft 428. In preferred embodiments, one end of the quill shaft 428 has one more tooth than the other, which allows for a precise Vernier-effect calibrated installation of torque split gear 422 and distributor gear pinion 432 and ensures that the desired precision of mesh of the distributor gear pinion 432 with distributor ring gear can be achieved. Thus, a quill shaft 428 is intermediately torsionally coupled in the drivetrain 400 between a torque split gear 422 and a distributor gear pinion 432. The stiffness of the quill shaft 428 can be tuned to achieve desired gearbox dynamic characteristics.

The first and second distributor gear pinions 432, 434 transmit torque to a distributor gear 450. The distributor gear 450 is an input floatring gear. As used herein, a "floatring gear" refers to a ring gear that is not directly supported by bearings or directly carried on a shaft. Instead, the "floatring gear" is supported by tooth forces at gear mesh interfaces, and thus floats. To achieve effective floating support of a distributor gear 450, the mesh faces and interfacing gears must be configured in specific manners.

The distributor gear 450 achieves floating support through advantageous configuration of an internal face 452, a left- or right handed first external helical interface 456, and an opposite-handed second external helical interface 458. It is contemplated that the first and second external helical interfaces can be spaced further apart on centerline than twice the face width of either external helical interface. A plurality of planet gears 460, 462 orbit the distributor gear 450. A planet gear 460 is configured with a single helical interface 464 to mesh with the distributor gear 450 on one end, and with a spur gear 466 on the distal end. Some planet gears may be placed in an outward configuration 462, while other planet gears may be placed in an inward configuration. An outward configuration of a planet gear 462 is one in which the larger diameter end of the planet gear is positioned away from the power source 350. The combination of planet gears 460, 462 in both outward and inward configurations between a common distributor gear 450 and output ring gear 470 advantageously allows for more planet gears and hence greater torque transmission with minimal weight increase, thereby increasing the power-to-weight ratio of the drivetrain 400.

In a corresponding double planetary system of the of the prior art, which achieves the same reduction ratio, one would need much thicker planetary gears to accomplish an equivalent torque transmission without breaking gear teeth. This is because in such a prior art system speed reduction is accomplished in two smaller steps, which at least doubles the gear weight relative to a gearbox that uses a floatring gear. Thus it can be seen that in preferred embodiments, a gearbox having a number of planet gears disposed about a distributor gear in a manner that yields a power-to-weight ratio of at least twice that of a corresponding double planetary reduction system that uses the same materials and has the same load capability.

Any suitable number of planet gears 460, 462 can be utilized, but preferably at least 6, 8, 10, 12, 15, 20, 22, or more such gears. Unless the context dictates the contrary, all ranges set forth herein should be interpreted as being inclusive of their endpoints. Similarly, all lists of values should be considered as inclusive of intermediate values unless the context indicates the contrary. The planet gears are preferably sized to collectively transfer at least 3,000, 5,000, 10,000, 20,000, 30,000, 40,000, 50,000 horsepower or even more. A currently preferred version operates at 9,400 horsepower.

In preferred embodiments, the spur gear portion of the planet gears 460, 462 mesh with and transmit power to an output ring gear 470 which has an internal gear mesh. The output ring gear 470 is advantageously coupled to a rotor hub 314 by means of a flex coupling 472 that performs a strain isolation function. A first blade 316 and second blade 318 are advantageously coupled to the rotor hub 314.

All suitable reduction ratios are considered, but in especially preferred embodiments, gears are sized and configured to achieve a speed reduction from at least 4:1 to 100:1 or more. Such large reductions are contemplated to be especially useful for helicopters and other rotorcraft, with a currently preferred embodiment having a ratio of 4.8 to 1 for the distributor stage reduction, and a ratio of 55.2:1 for the gearbox in helicopter mode and 96.5 to 1 in airplane-mode cruise flight. As used herein, the term "gearset" means the gears inside a gearbox. The final reduction ratio of a gearset is largely influenced by the ratio of diameters of the distributor gear 450 which is preferably a helical gear, the planet gears 460, 462, and the output ring gear 470, which is preferably a spur gear. The helical and spur gears could be advantageously sized and dimensioned to produce a reduction of at least 4:1, 10:1, 20:1, or even 50:1.

Preferred embodiments achieve these reduction ratios from a maximum engine input speed of 4,000 to 30,000 revolutions per minute. A currently preferred configuration has an output ring gear 470 with 374 internal teeth, but all suitable numbers of teeth are contemplated, including 100, 300, 500, 700, 900, and even 1,100 teeth. A currently preferred output ring gear 470 has a diameter of approximately 5 feet, but all suitable diameters are contemplated including 2, 4, 6, 8, 10, 16, and even 20 feet. In especially preferred embodiments, the distributor gear pinions 432, 434 and the distributor gear 450 are advantageously disposed within the inside diameter of the output ring gear 470. In currently preferred configurations, a pinion gear 460 has 20 teeth on the spur end 466 and 73 teeth on the single helical end 464. However, all suitable numbers of teeth are contemplated, including 10, 25, 50, and 75 on the spur end, and 20, 50, 100, and 200 teeth on the single helical end 464.

A person skilled in the art will recognize that the drivetrain 400 achieves effective load sharing and torque splitting through the advantageous combination of several mechanisms. One such mechanism is the use of a plurality of torque split gears 422, 424 connected through a torque split idler gear 426, which allows all torque split gears 422, 424 to transmit power even though not all of the torque split gears 422, 424 might be powered at a given time. Another mechanism is the use of quill shafts 428, 430 with tailored torsional compliance to allow for precision mesh and load sharing between torque split gears 422, 424, first and second distributor gear pinions 432, 434, and the distributor gear 450. A further mechanism arises from the configuration of the distributor gear 450 as a floatring gear and the tooth profile shape of the gear teeth on the planet gears 462. The load sharing and torque splitting features incorporated in the gearbox nearly equally share loads and reduce weight and increase the power-to-weight ratio by evening the loads on gear teeth in the drivetrain 400. As used herein, to "nearly equally share" a load means that components share a load within 15% of each other.

Figure 5:
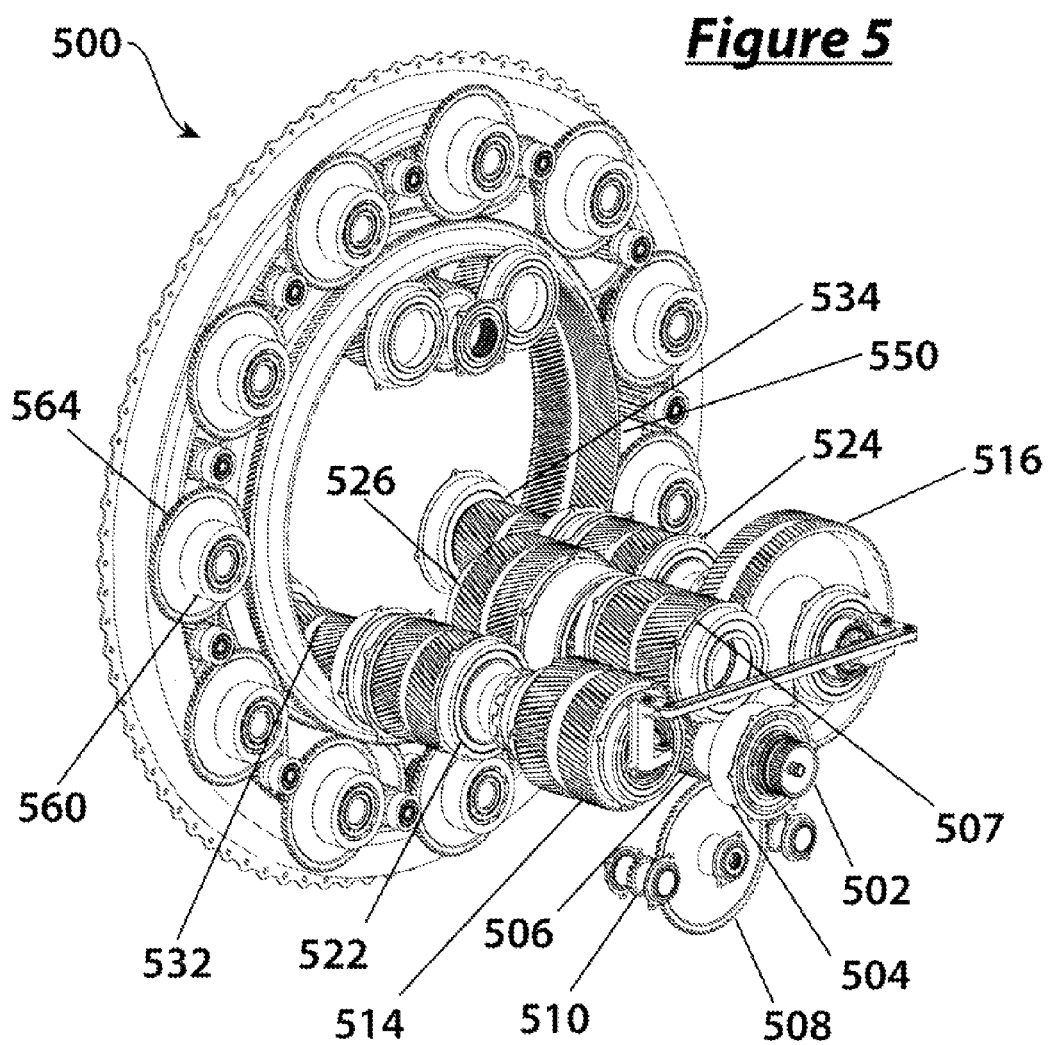
FIG. 5 is a perspective view of an alternate preferred drivetrain.
Figure 6:
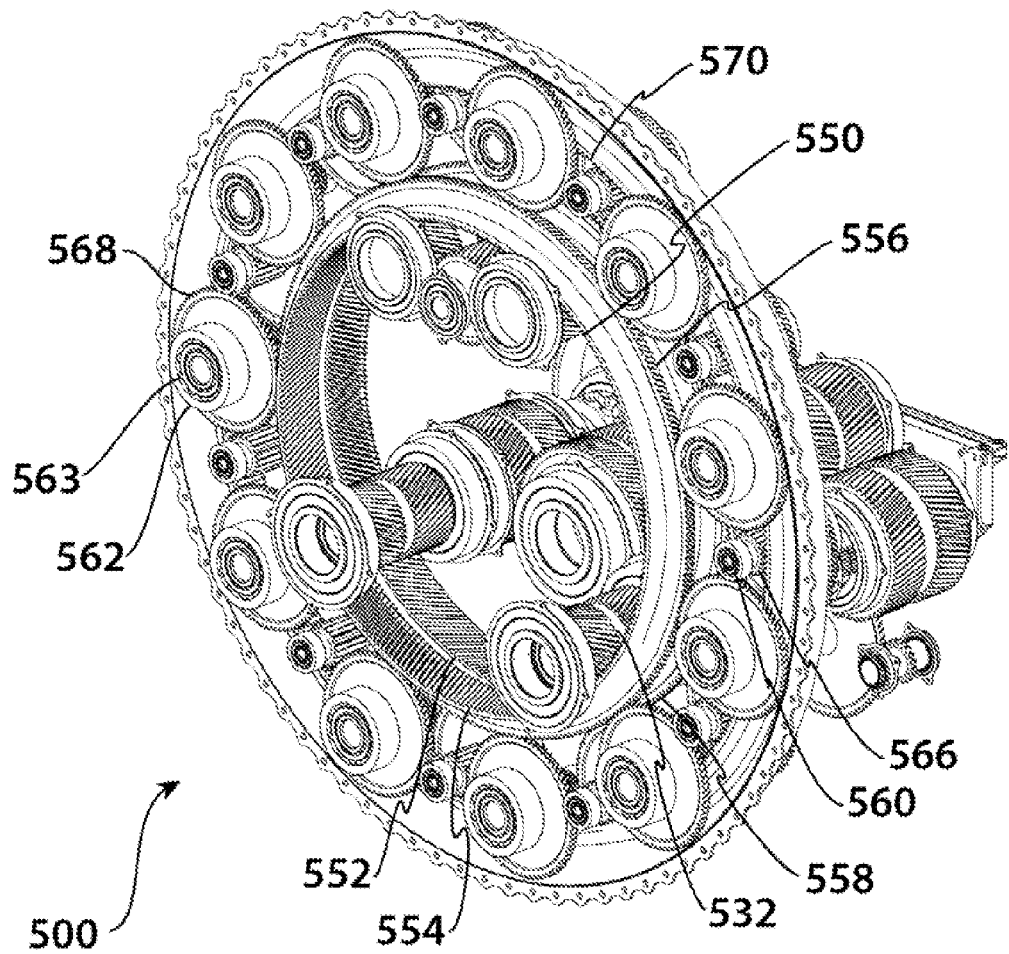
FIG. 6 is an alternate perspective view of the gearbox of FIG. 5.

Viewed from another perspective, the present inventive material can enable alternate preferred embodiments, such as the drivetrain 500 shown from opposite angles in FIG. 5 and FIG. 6.

In this preferred embodiment, a turbine engine provides the input to the gearbox through an engine pinion gear 502. Power is then transferred to a drive gear 506. In the case of left and right handed assemblies a reversing idler gear 507 can be added. In especially preferred embodiments there can be one or more drive gears for driving in more than one mode. For example a helicopter mode gear at a high output speed, low-ratio gear 514 and an airplane cruise low output speed, high-ratio gear 516. In other preferred embodiments there can be more than one engine input, with the idler and drive gears described above replicated for each additional engine installation. Further, an accessory gear 508 and generator gear 510 can be included in the drivetrain.

Distributor pinion gears 532, 534 are coupled in the drivetrain through a torque split gears 522, 524 and a torque split idler gear 526. The distributor pinion gears 532, 534 then engage a large diameter floatring distributor gear 550. The purpose of this gear 550 is to create a large diameter about which small, lightweight driven planet gears 560, 562 can be distributed to share the output torque load. This distributor gear 550 has two single rows helical tooth pattern on the external circumference 556, 558, meaning that any planet gear 560, 562 driven off these tooth patterns on the external circumference 556, 558 only engages with one row of teeth. Thus, the driven end 564 of planet gear 560 engages only with the single row 558 of distributor gear 550. By contrast, the distributor gear 550 has a double row helical tooth pattern on the internal circumference 552, 554, meaning that the driving distributor pinion gears 532, 534 each engage with both a forward helical tooth pattern 554 and aft helical tooth pattern 552. This outer diameter drives a large array of alternating forward planet gears 560 and forward planet gears 562.

Figure 7:
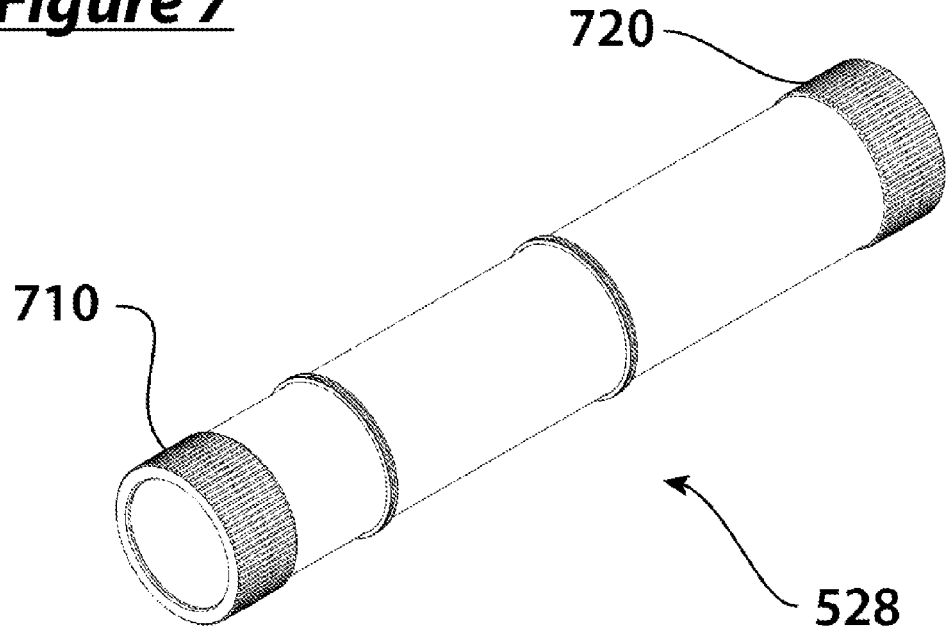
FIG. 7 is a perspective view of a torsionally compliant quill shaft.

Advantageously, a quill shaft 528, as shown in FIG. 7 can be intermediately torsionally coupled between a torque split gear 522 and a distributor pinion gear 532. The stiffness of such shaft 528 can be tailored to allow precision assembly and meshing between distributor pinion gear 532 and distributor gear 550. It is contemplated that the quill shaft 528 can be configured to have a first spline 710 on a forward end of the shaft 528 and a second spline 720 on an aft end. The number of teeth on the splines 710, 720 is advantageously different, preferably by a single tooth to allow for precision installation.

The helical tooth form on the distributor gear 550 and planet gears 560, 562 results in an axial load being imparted to the planet gears 560, 562. The alternating forward and aft driven helical gears are placed such that the helical tooth form will drive them each toward the distributor gear 550, thus balancing the net force on the gear system and allowing the distributor gear 550 to float and thus act as an input floatring gear. Backlash in the gear system is taken up by applying an axial load to an individual driven planet gear so that its helix engages that of the external teeth of the distributor gear 550. It is this adjustment of backlash in each driven gear that allows the system to evenly load share across an array of driven planet gears. By evenly load sharing across a large array of driven planet gears 560, 562, the net torque carried by each is reduced.

Conducting the largest change in gear ratio in the final step of reduction confines the large torque increase associated with this decrease in speed, to the large load sharing array of driven planet gears, thereby reducing the weight of the system. In the preferred embodiment, the axial load imparted to the array of driven planet gears 560, 562 is reacted through the use of bearings 563 attached to each end of the driven planet gears such that the loads are reacted through bearings to a fixed housing. The array of driven planet gears 560, 562 is positioned during assembly so they will equally share the load. This enables the array of driven planet gears 560, 562 to dynamically control their axial displacement and balance their engagements to the distributor gear 550. In large torque capacity gearbox applications such as this, it is this large distributed torque splitting capability that reduces overall system weight and increases reliability.

Located on the same shaft as each helical driven gear 560, is a drive pinion gear 566. An exemplary drive pinion 566 engages an output internally toothed ring gear 570 which in turn drives the rotor system. The toothed ring gear 570 is preferably a spur gear, meaning it has teeth in spur pattern. In the preferred embodiment, all gears have their rotating axis in the same direction as that of the output gear and the engine pinion. In other preferred embodiments the engine pinion can be orthogonal to the output gear and other gears in the drive system. This would accommodate, for instance, a vertical helicopter drive system with a horizontally mounted engine input. Thus, the preferred embodiment can be viewed as a gearset 500 having a helical distributor gear 550 that is a floatring gear disposed relative to a spur gear 570 to produce automatic torque balancing by means of planet gears 560, 562 equipped with both helical teeth 564 and spur teeth 566.

Figure 8:
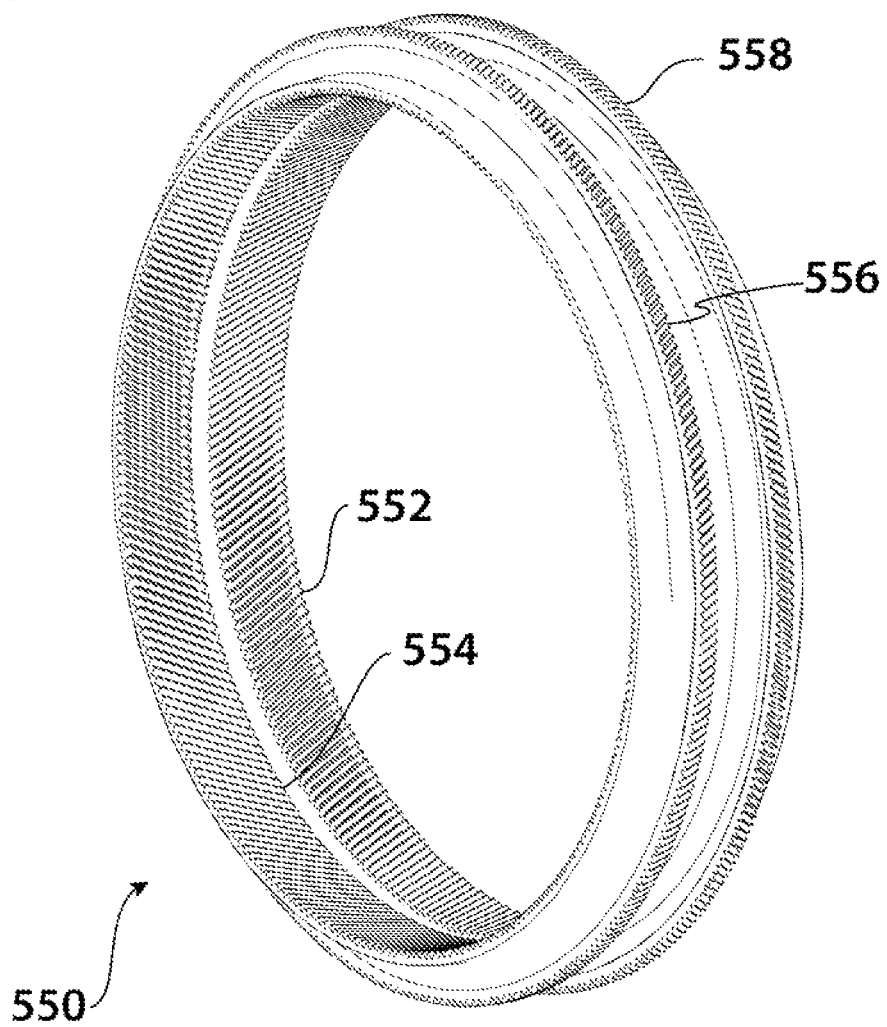
FIG. 8 is a perspective view of a distributor gear, advantageously configured with helical teeth in such a way as to be an input floatring gear.

It is thus contemplated to provide a gearset having a helical gear disposed relative to a spur gear to produce automatic torque balancing. This can be advantageously accomplished where the helical gear is an input floatring gear, and preferably where the helical gear has first and second rows of helical teeth oriented to opposite sides of the gear. An exemplary input floatring distributor gear 550 is shown in FIG. 8. First and second single rows of helical teeth 556, 558 are oriented to opposite sides of the gear 550, and disposed on the external circumference of said gear 550. A double row of helical teeth, comprising left-handed teeth 552 and right-handed teeth 554 is disposed on the internal circumference of the gear 550. A plurality of aft planet gears, exemplified by gear 562, can mate with the first row of helical teeth 556. Similarly, a plurality of forward planet gears, exemplified by gear 560, can mate with the second row of helical teeth 558. All suitable numbers of such planet gears are contemplated, including at least 6, 10, 16, 20, 30, and 40 planet gears mating with either the first or second row of helical teeth.

As used herein, the term "double row" of teeth is distinguished from "two rows" of teeth. A "double row" of teeth is used to indicate that both of the double rows simultaneously meshes with a single mating gear. The notation "two rows" of teeth is used where each of the two rows meshes with a different gear.

A planet gear 560 preferably has both helical teeth 564 to mate with the distributor gear 550, and spur teeth 566 to mate with an output ring gear 570. The planet gears 560, 562 are preferably disposed in pairs on opposite sides of the helical gears 556, 558. Ideally, a gearbox 500 would have a number of planet gears 560, 562 disposed about the input ring gear 550 in a manner the yields a power-to-weight ratio of at least twice or three times that of a corresponding conventional double planetary reduction system that uses the same materials and has the same load capability.

The spur teeth 566 of a planet gear 560 advantageously mate with an output internal ring gear 570. The helical and spur gears can have any suitable relative sizes, dimensions, and positions, but preferably cooperate to produce any suitable reduction.

All suitable materials are contemplated for the various gears. For example, the gears are manufactured from carburized and nitrided aerospace steels that come from vacuum arc re-melt steel bar. Additional gear processing include shot peening and finish grinding them to AGMA Quality 13 standards. Similarly, all suitable tooth designs are contemplated for the helical and spur gear teeth. Currently, the most preferred helical and spur tooth design starts with a basic design that conform to the AGMA standard design system but have modified tooth profiles with the appropriate tip and flank modification as well as longitudinal tooth modifications to maximize load carrying capability and life as well as operate efficiently and quietly.

Methods are especially contemplated for increasing a power-to-weight ratio in a rotorcraft, such methods comprising: utilizing a gearbox that transmits torque from a floating input ring though a plurality of assembled interconnect gears to a floating output gear; and using teeth patterns on opposite sides of the input ring such that operation of the gearset transmits less than 0.01%, 0.001%, and even 0001% of an operating load axially or radially to a wall of the gearbox. This can be advantageously accomplished where the input gear has helical teeth oriented in opposite directions on opposite sides of the input ring, and independently where the assembled interconnect gears have both helical teeth and spur teeth.

Such methods are contemplated to be especially useful where the input ring is sized to transmit at least 3,000, 5,000, 10,000, 20,000, 30,000, 40,000 50,000 horsepower or even more. It is especially advantageous when carrying such large loads that the methods can be implemented while eliminating a need for a bearing to support the output gear.

During assembly, a gearbox according the inventive concepts herein can be fabricated by: providing a helical ring gear and an internal spur ring gear; axially positioning each of a plurality of distributor planet gears (countershaft gears) relative to the helical and spur gears; rotating the input gear such that different ones of the countershaft gears will move to slightly different axial positions due to their respective manufacturing tolerance differences, and whereby individual radial and axial loads from the countershaft gears are balanced to produce substantially no collective axial or radial load on the output gear; and clamping the countershaft gears in place.

In one aspect of preferred methods of assembly the countershaft gears are paired, with members of each pair disposed on opposite sides of the helical gear. Another aspect of preferred methods of assembly includes installing at least 6 pairs of the countershaft gears. Yet another aspect of preferred methods of assembly includes causing each idler counter shaft gear to equally share a distributed load.

Thus, specific embodiments and applications of a torque balancing gearbox have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A gearset having a distributor gear disposed relative to a spur gear to produce automatic torque balancing, wherein the distributor gear is an input floatring gear, and the distributor gear has first and second rows of helical teeth oriented to opposite sides of the gear further comprising at least 10 planet gears that mate with the second row of helical teeth.

2. The gearset of claim 1, wherein the distributor gear has a set of double helical teeth disposed on the internal diameter of the distributor gear.

3. The gearset of claim 1, wherein each planet gear has an end having helical teeth and a distal end having spur teeth.

4. The gearset of claim 1, wherein the spur gear is an output internal ring gear.

5. The gearset of claim 1, wherein the helical and spur gears are sized and dimensioned to produce a reduction of at least 4:1.

6. The gearset of claim 1, wherein the helical and spur gears are sized and dimensioned to produce a reduction of at least 20:1.

7. A rotorcraft having a gearset according to claims 1.

8. A gearbox having a gearset according to claim 1, wherein the planet gears are sized to collectively transfer at least 5000 horsepower.

9. The gearbox of claim 8, wherein the gearbox has a total number of planet gears of at least 12.

10. The gearbox of claim 9, wherein the planet gears have a helical teeth pattern, and are disposed on opposite sides of an output ring gear.

11. The gearbox of claim 9, wherein the planet gears are disposed to transmit power to an output ring gear having internal spur teeth.

12. The gearbox of claim 8, wherein the gearbox has a total number of planet gears of at least 20.

13. A gearbox having a gearset according to claim 1, wherein the planet gears are sized to collectively transfer up to 50,000 horsepower.

14. The gearset of claim 1, wherein the at least 10 planet gears are disposed in a countershaft arrangement.

* * * * *